(12) United States Patent
Sugita et al.

(10) Patent No.: US 6,266,728 B1
(45) Date of Patent: Jul. 24, 2001

(54) NETWORK SYSTEM HAVING A BRIDGE THAT ASSIGNS IDENTIFICATION NUMBERS TO BUSES CONNECTED AS A TREE AND THAT RESERVES SOME IDENTIFICATION NUMBERS

(75) Inventors: Takehiro Sugita, Kanagawa (JP); Hisato Shima, San Jose, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/232,632

(22) Filed: Jan. 19, 1999

(30) Foreign Application Priority Data

Jan. 23, 1998 (JP) .................................................. 10-011840

(51) Int. Cl.⁷ ...................................................... G06F 13/38
(52) U.S. Cl. ............................ 710/126; 710/128; 710/16; 710/9
(58) Field of Search .................................... 710/126–129, 710/101, 107, 120, 241, 36, 38, 43, 16, 8, 9, 10, 11

(56) References Cited

U.S. PATENT DOCUMENTS

| 5,018,133 | | 5/1991 | Tsukakoshi et al. . | |
|---|---|---|---|---|
| 5,398,242 | | 3/1995 | Perlman . | |
| 5,513,182 | * | 4/1996 | Kawamura et al. ................ | 370/94.3 |
| 5,542,055 | * | 7/1996 | Amini et al. ........................ | 710/101 |
| 5,761,448 | * | 6/1998 | Adamson et al. ................... | 710/104 |
| 5,835,738 | * | 11/1998 | Blackledge, Jr. et al. .......... | 710/127 |
| 5,857,084 | * | 1/1999 | Klein .................................. | 710/129 |
| 5,889,965 | * | 3/1999 | Wallach et al. .................... | 710/103 |
| 6,094,699 | * | 7/2000 | Surugucchi et al. ............... | 710/128 |
| 6,098,113 | * | 8/2000 | Heil et al. .......................... | 710/1 |

FOREIGN PATENT DOCUMENTS 0614297   9/1994 (EP) .

OTHER PUBLICATIONS

Casale, S., "A Remote Teckniques to Increase Performability in Distributed Systems", IEEE Transactions on Industrial Electronics, vol. 41, No.2, Apr. 1994, pp. 182–190.

Paskins, Adrian, "The IEEE 1394 BUS", IEE Half–Day Colloquium on New High Capacity Digital Media and Their Applications, May 12, 1997, pp. 4/1–4/06.

\* cited by examiner

*Primary Examiner*—Robert Beausoleil
*Assistant Examiner*—Raymond N Phan
(74) *Attorney, Agent, or Firm*—Jay H. Maioli (57) ABSTRACT

When many buses are provided, addition/omission of a bus frequently occurs. Whenever the addition/omission of the bus occurs, a configuration process of the overall network system must be performed. Thus, interruption of data communication occurs frequently. Second bridges are provided that are bridges each having a function of performing a configuration process for assigning individual identification numbers to a lower network. The second bridges are used to connect buses to one another.

3 Claims, 7 Drawing Sheets

NETWORK SYSTEM HAVING A BRIDGE THAT ASSIGNS IDENTIFICATION NUMBERS TO BUSES CONNECTED AS A TREE AND THAT RESERVES SOME IDENTIFICATION NUMBERS

BACKGROUND OF THE INVENTION

1. Field of the Invention

The present invention relates to a network system incorporating a plurality of buses each of which is constituted by connecting a plurality of nodes to one another with communication-control signal lines each of which is capable of transmitting a control signal and an information signal in a mixed manner, and to a bridge apparatus for connecting the buses to one another.

2. Related Background Art

Network systems have been widely used that are constituted by connecting a multiplicity of computers, peripheral equipment or AV apparatuses to one another. Each of the apparatuses which are connected as described above is called a "node" which includes an interface for establishing the connection with the other apparatuses.

Figure 1:
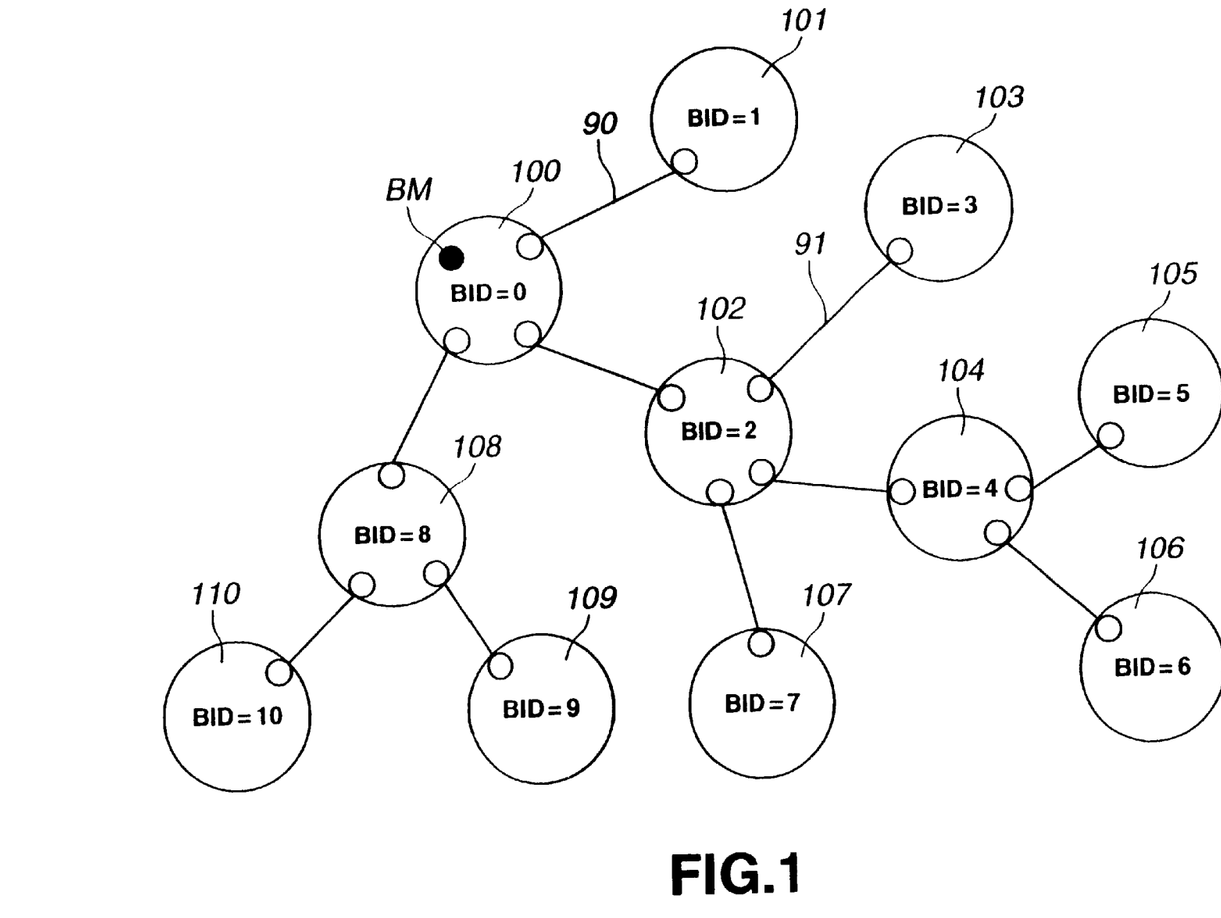
FIG. 1 is a diagram showing the structure of a conventional network system.

The structure of the conventional network system is shown in FIG. 1. The network system shown in FIG. 1 is constituted by connecting eleven buses 100 to 110, each of which is formed by connecting a plurality of nodes to one another with communication-control signal lines, to one another by bridges 90 and 91 for example.

The communication-control signal lines may be signal lines of a type based on IEEE1394 which is a standard for serial interfaces. Not more than sixty three nodes can be connected to one bus because of the regulation of IEEE1394. If a larger number of nodes must be connected, a plurality of buses must be prepared to connect the buses to one another with the bridges 90, 91 and so forth. IEEE1394 defines a fact that a large-scale network system can be constituted by not more than 1023 buses. Moreover, IEEE1394 defines a fact that determination of states of the connection among the buses and assignment of identification (ID) numbers for the buses are automatically performed. The process for assigning the ID for the bus is called a configuration process. The configuration process is performed when a bus is added or omitted, the configuration process being performed in the overall network system.

If the number of the buses is increased, addition and omission of the buses are performed frequently. Whenever the addition or the omission is performed, the configuration process must be performed in the overall network system. Therefore, interruption of data communication frequently occurs. What is worse, there is apprehension that the apparatus is operated incorrectly or data is eliminated. Since the computer and peripheral equipment must have significant reliability, frequent configuration processes undesirably cause the operations of the apparatuses to be unstable.

In a case of a large-side network system having a multiplicity of buses, there is a possibility of using, to connect the buses to one another, a line connection type communication passage, such as the public telephone network, or a wireless communication. The communication passages of the above-mentioned types suffer from unstable connection and easily encounter occurrence of unintentional connection and disconnection. In the above-mentioned case, there is a possibility that configuration is frequently repeated. Thus, there is apprehension that the network system becomes unstable.

If the apparatus, for example, the node or the bridge, breaks down or becomes defective, the network system cannot always be operated in conformity with the foregoing standard. Also the foregoing fact causes the operation of the network system to be unstable.

SUMMARY OF THE INVENTION

In view of the foregoing, an object of the present invention is to provide a network system and a bridge apparatus each of which can stably be operated by reducing a frequency of configuration processes which occur in the overall system.

According to one aspect of the present invention, there is provided a network system constituted by connecting a plurality of buses to one another by bridges so that a tree structure is formed having a bus in which a network manager, serves as a center and is arranged to perform configuration so as to sequentially assign numbers to the buses, wherein only when the number of the identification numbers which have been previously reserved is smaller than the number of buses which are newly added, a configuration demand is communicated to an upper level, and a configuration process of a lower tree structure is performed in other cases.

Specifically, a number of buses which is larger than the number of buses which is included in a tree structure in which the bridge serves as the top of the tree structure is previously reserved. If a cause of configuration occurs in the tree structure and a configuration demand is received, the configuration demand is not communicated to the upper level of the tree structure if the number is not larger than the number of buses which have previously been reserved. A means disposed in the tree structure and arranged to perform the configuration process solves the above-mentioned problem.

Therefore, if a cause to perform re-configuration occurs in the tree structure having the bus which serves as the top of the tree structure, the configuration demand is not communicated to the upper level if a sufficiently large number of buses are reserved. Thus, a frequency of the configuration in the overall network can be reduced.

Other objects, features and advantages of the invention will be evident from the following detailed description of the preferred embodiments described in conjunction with the attached drawings.

DESCRIPTION OF THE PREFERRED EMBODIMENTS

An embodiment of a network system and a bridge apparatus according to the present invention will now be described with reference to the drawings.

Figure 2:
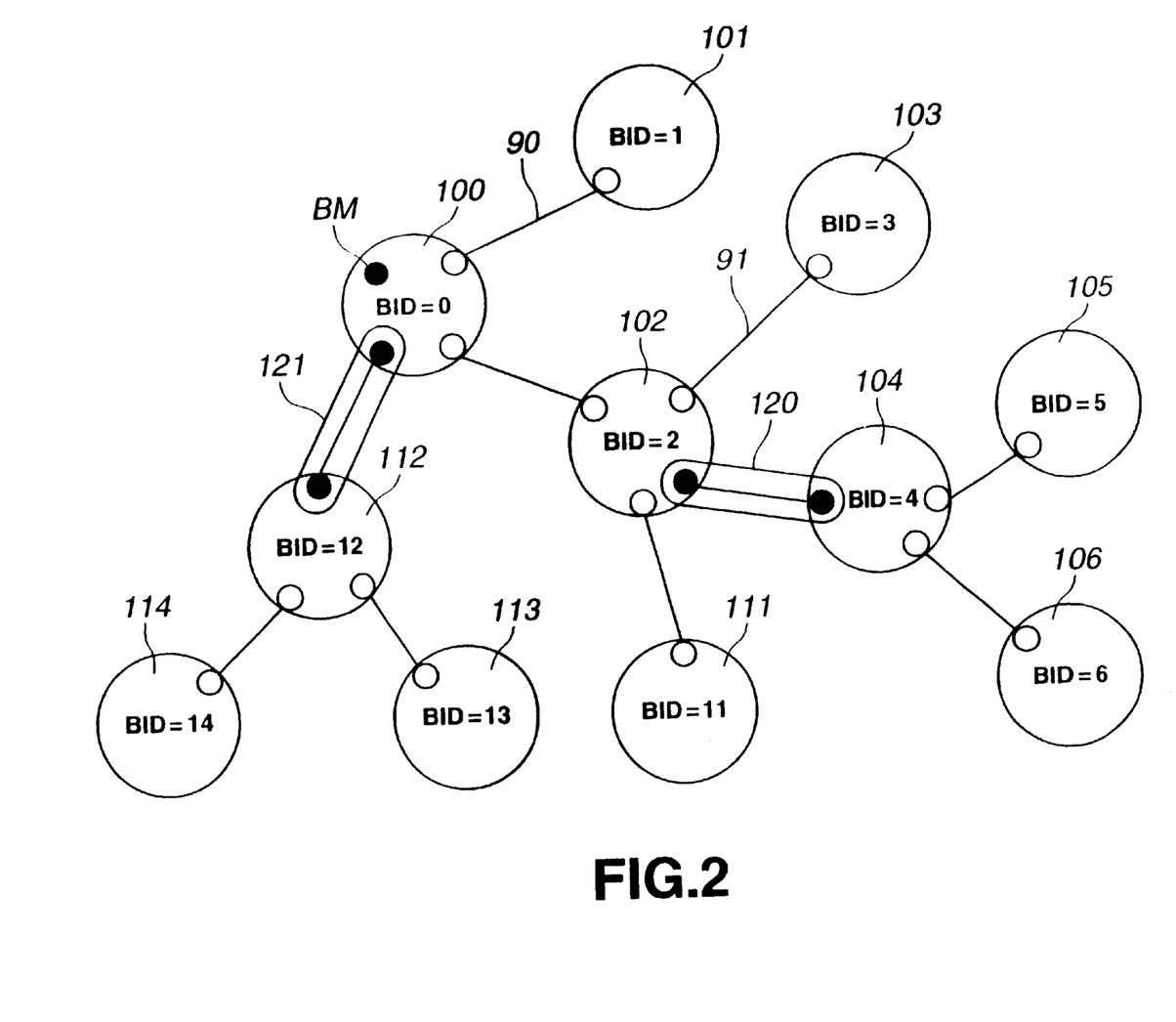
FIG. 2 is a diagram showing the structures of a network system and a bridge apparatus according to an embodiment of the present invention.

A network system according to this embodiment is, as shown in FIG. 2, constituted by connecting a multiplicity of computers, peripheral equipment or AV apparatuses to one another. Each of the apparatuses includes an interface for establishing the connection with the other apparatuses. The foregoing apparatuses are generally called nodes.

The network system according to this embodiment incorporates two types of bridges which are first bridges and second bridges for connecting eleven buses 100 to 106 and 111 to 114 to one another.

First bridges 90 and 91 are conventional bridges for connecting, for example, the bus 100 and the bus 101 to each other and connecting the bus 102 and the bus 103 to each other. The first bridge 90 is constituted by an inlet/outlet port (hereinafter called a portal) and a portal in the bus 101. The first bridge 91 is constituted by a portal in the bus 102 and a portal in the bus 103.

Second bridges 120 and 121 are bridges each having a function for performing a configuration process for assigning an individual identification number to each of several downstream networks. Thus, the bus 102 and the bus 104 are connected to each other and the bus 100 and the bus 112 are connected to each other, as shown in FIG. 2. The second bridge 120 is constituted by a portal in the bus 102 and a portal in the bus 104. The second bridge 121 is constituted by a portal in the bus 100 and a portal in the bus 112. The second bridges 120 and 121 are embodiments of the bridge apparatuses according to the present invention. Therefore, the embodiment of the bridge apparatus according to the present invention is included in the embodiment of the network system according to the present invention.

The second bridges 120 and 121 connect the plurality of the buses to one another and perform a configuration process such that a tree structure of the plural buses is formed to sequentially assign continuous identification numbers to the buses.

Figure 3:
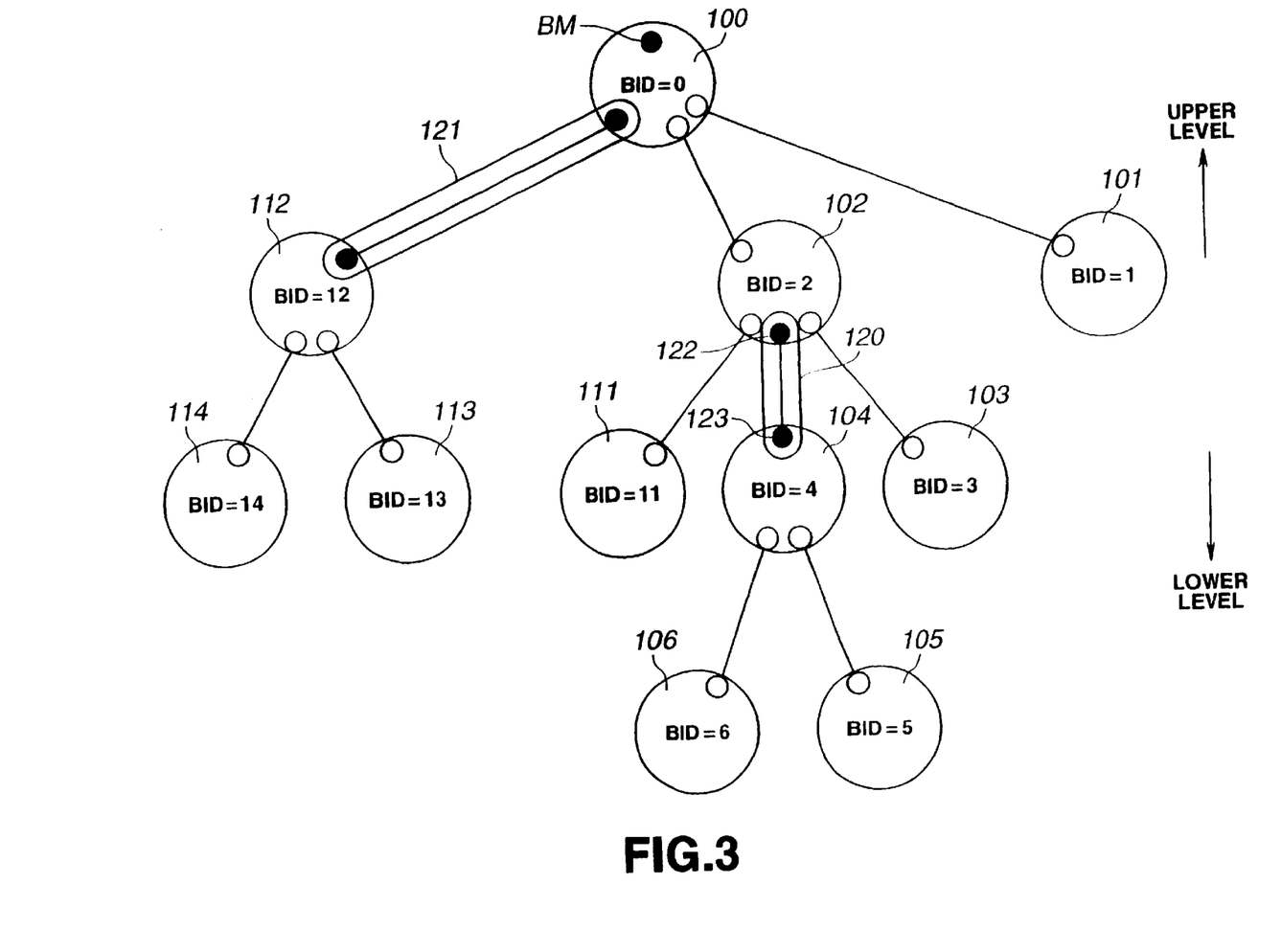
FIG. 3 is a diagram simply showing the network system shown in FIG. 2 in the form of a hierarchical/structure.

FIG. 3 is a diagram simply showing the structure shown in FIG. 2 in a hierarchical form. The bus 100 including a bridge manager BM for managing the bridge is formed at the uppermost level of the hierarchy. The bus 100 is the center of a tree structure. The second bridges 120 and 121 obtain bus numbers which are larger than the number of actual buses when configuration is performed from an upper hierarchy.

Referring to FIG. 3, the second bridge 120 manages buses 104, 105 and 106 to which bus IDs (BIDs) 4, 5 and 6 are assigned. The second bridge 120 reserves bus IDs 7 to 10, the number of which is larger than the number of actual buses.

The second bridge 121 manages bus 112, 113 and 114 to which bus IDs 12, 13 and 14 are assigned. The second bridge 121 reserves bus IDs 15 to 20, the number of which is larger than the number of actual buses.

Since the second bridges 120 and 121 have bus IDs, the number of each of which is larger than the number of the actual buses, configuration of only a lower hierarchy is required if a bus is added to the lower hierarchy. That is, a necessity of again performing configuration of the overall network can be eliminated. Therefore, even if a cause of configuration occurs in the tree structure having the second bridge which serves as the top, a demand for performing configuration is not communicated to upper levels. Thus, frequency of configuration of the overall network can be lowered.

Figure 4:
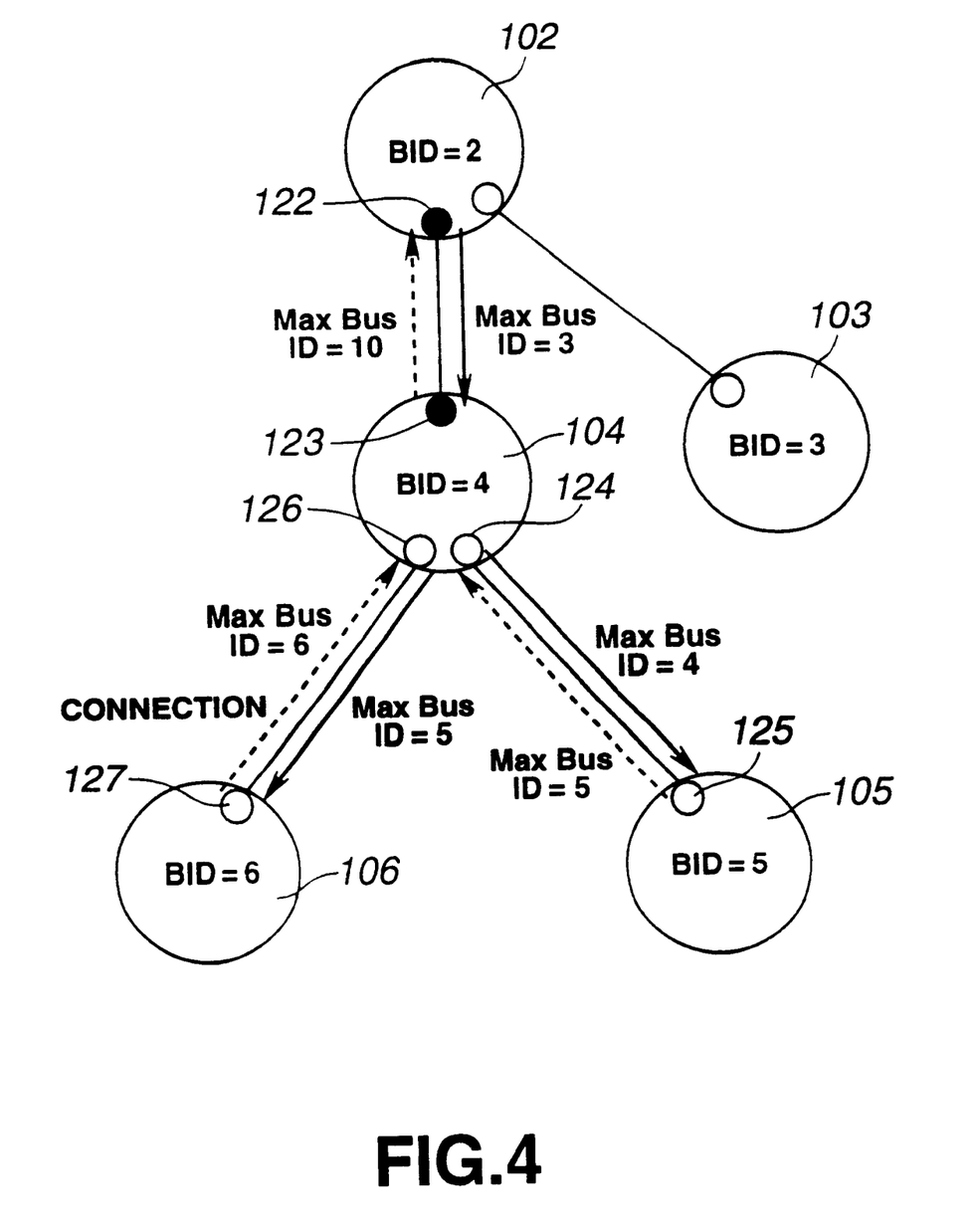
FIG. 4 is a diagram showing a state in which a second bridge of the network system performs configuration of a bus managed by the second bridge.

FIG. 4 shows a state in which configuration of the buses 104, 105 and 106 managed by the second bridge 120 is performed. The configuration is performed such that the number of the buses is counted while bus IDs are assigned. As described above, the second bridge 120 is composed of the portal 122 in the bus 102 and the portal 123 in the bus 104.

The portal 123 constituting the second bridge 120 receives a maximum bus ID (Max Bus ID which is 3 in this embodiment) from the portal 122 which constitutes the second bridge 120. Then, the portal 123 passes, to the portal 124 constituting the first bridge in association with the portal 125 of the bus 105, Max Bus ID (=4) obtained by adding 1, which indicates the ID of the bus 104 to which the portal 123 belongs. The portal 124 passes Max Bus ID (=4) to the portal 125. The portal 125 adds 1 to Max Bus ID (=4), and then sequentially passes Max Bus ID (=5) to the nodes in the bus 105. The portal 124 causes the nodes in the bus 105 to return Max Bus ID.

The same value (=5) is returned as Max Bus ID when the nodes in the bus 105 except for the portal 125 are nodes having no downstream bus connected thereto. If Max Bus ID is updated to a larger value, another portal exists in the bus 105 in addition to the portal 125. That is, a bus is connected downstream.

Since only the portal 125 exists in the bus 105 in the case shown in FIG. 4, the portal 124 returns Max Bus ID =5 to the portal 123.

Then, the portal 123 passes Max Bus ID (=5) to the portal 126 constituting the first bridge in the bus 104. Also the portal 126 passes Max Bus ID (=5) to the portal 127 which constitutes the first bridge. The portal 127 adds 1 to Max Bus ID (=5) to make Max Bus ID (=6) to be the bus ID of the bus 106. Then, the portal 127 sequentially passes Max Bus ID (=6) to the nodes in the bus 106 to cause the Max Bus ID to be returned from the nodes.

In the case shown in FIG. 4, only the portal 127 exists in the bus 106. Therefore, 6 is returned to the portal 123 as the Max Bus ID.

The number of buses (which is, for example, 4 in this embodiment) which are reserved, is added when Max Bus ID is returned to the portal 122 constituting the second bridge 120. Thus, Max Bus ID (=10) is returned. Thus, the second bridge 120 reserves a sufficiently large number of bus IDs.

Figure 5:
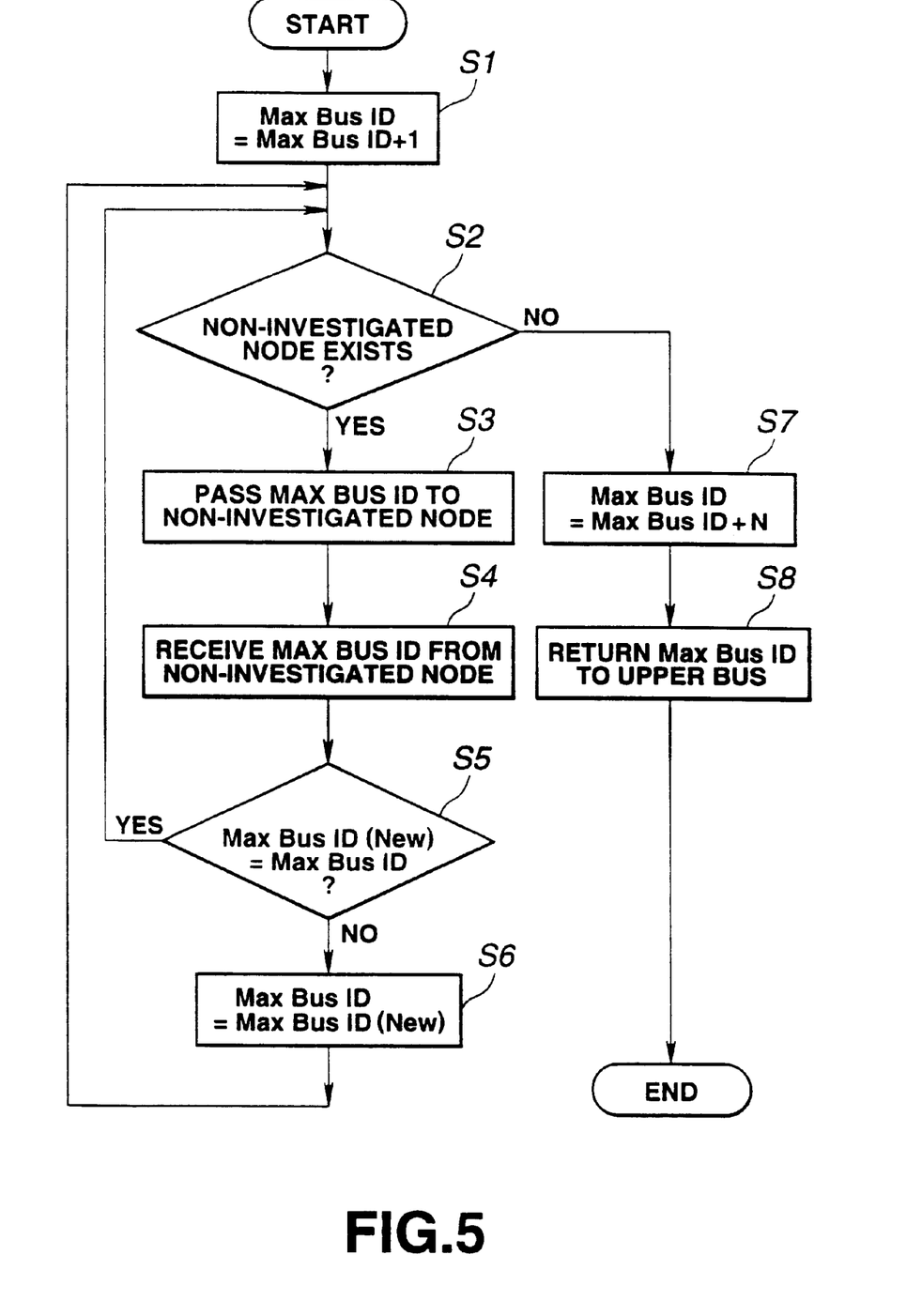
FIG. 5 is a flow chart of the operation which is performed when configuration of a lower portal in the second bridge is performed.

FIG. 5 is a flow chart of a lower portal in the second bridge, such as the portal 123 shown in FIG. 4, when configuration is performed. Initially, in step S1, 1 is added to Max Bus ID. The obtained bus ID is the bus ID of the bus to which the portal, such as the portal 123, belongs. In step S2 whether or not a non-investigated node exists is determined. If a non-investigated node exists, the operation proceeds to step S3 so that Max Bus ID is passed to the non-investigated node. In step S4 Max Bus ID is received from the foregoing node. If a determination is made in step S5 that the Max Bus ID is the same as the passed Max Bus ID, no bus is connected to the node. If the two Max Bus IDs are the same, the operation returns to step S2. If the two Max Bus IDs are different from each other (in this case, a larger Max Bus ID is returned), the Max Bus ID is updated in step S6. Then, the operation returns to step S2.

If no non-investigated node exists in step S2, configuration of the lower level has been completed. In step S7 a sufficiently large number of bus IDs are reserved. In step S8 Max Bus ID is returned to the upper level. Then, the operation is completed. In the conventional bridge, the operation in step S7 is not performed.

Figure 6:
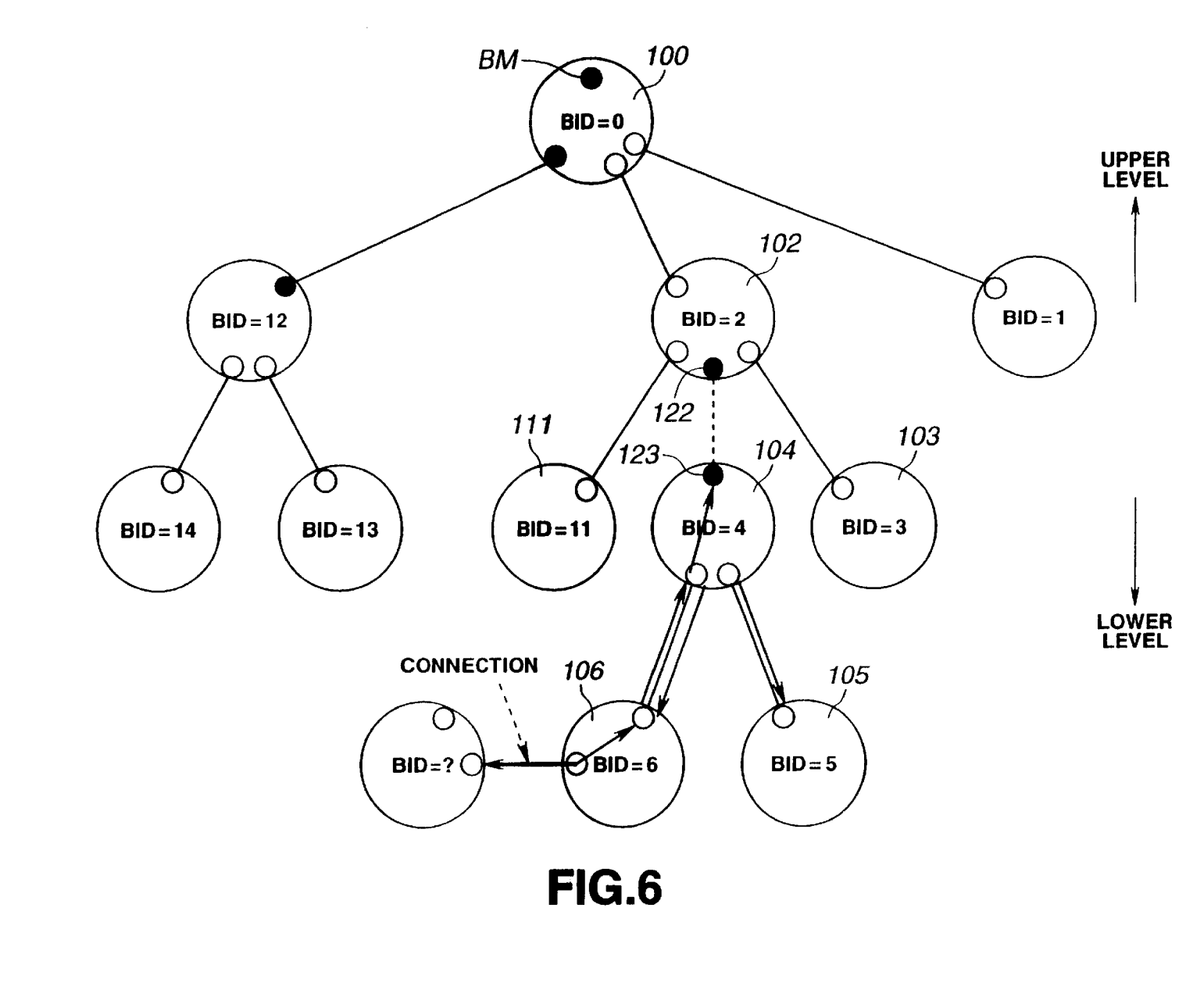
FIG. 6 is a diagram showing the operation of a portal of the second bridge when a configuration demand is supplied because of addition of a bus to the lower level.

FIG. 6 shows the operation of the portal 123 which constitutes the second bridge 120 when the portal 123 has received a configuration demand because of addition of a bus to the lower level. In this case, the second bridge 120 has reserved an abundant number (=4) of buses, which are BID 7 to BID 10, as described with reference to FIG. 4. In the structure shown in FIG. 6, one additional bus is connected to the bus 106. When configuration is demanded from the portal of the bus 106, the demand is communicated to the upper level. In the structure shown in FIG. 6, the second bridge 120 individually performs configuration of the lower level so as to assign the bus ID (BID=7) of the lower level to the bus newly added to the bus 106. Since Max Bus ID returned from the lower level is not larger than the Max Bus ID returned by the portal 123 to the upper level, the configuration process is completed.

Figure 7:
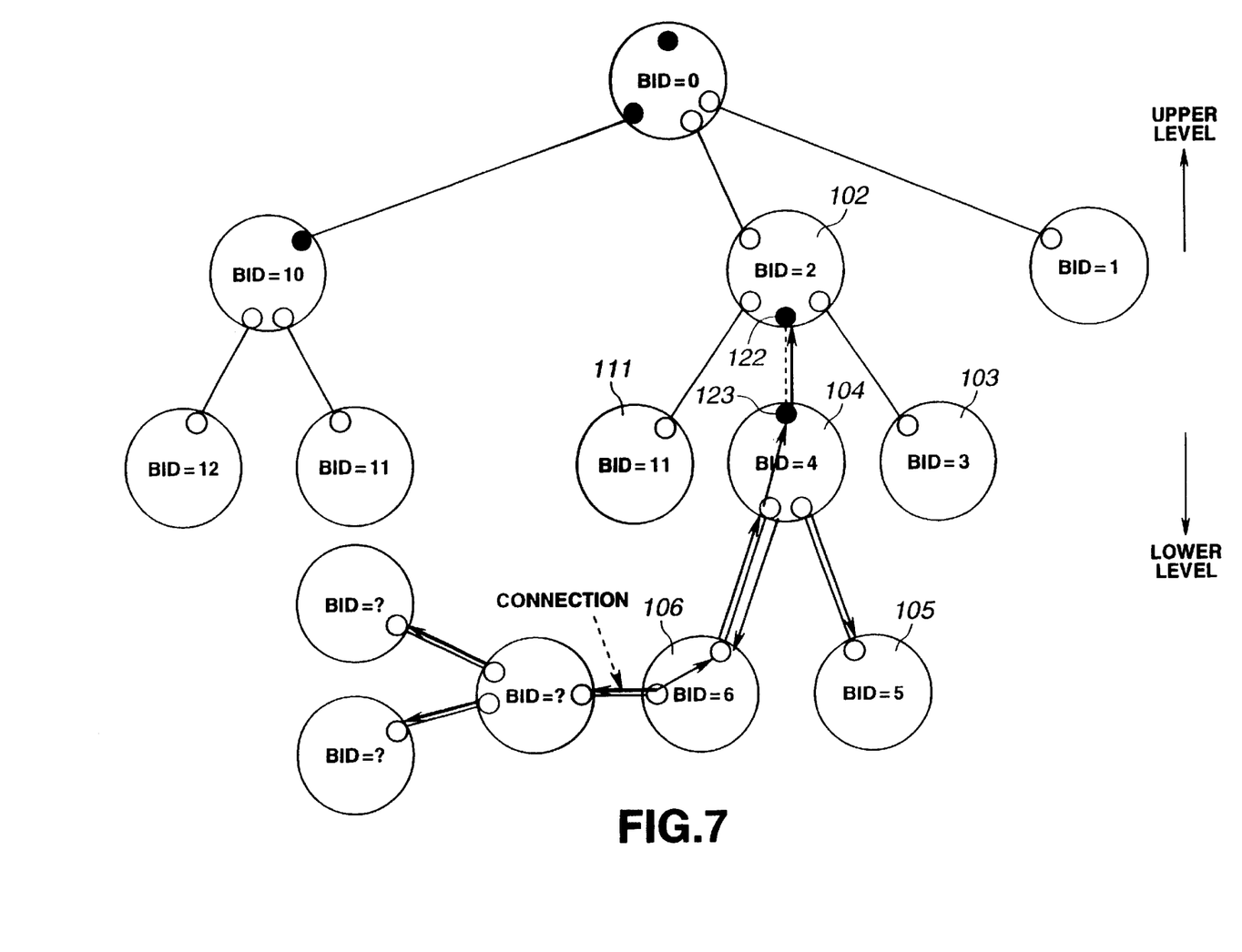
FIG. 7 is a diagram showing another operation of the portal of the second bridge when a configuration demand is supplied because of addition of a bus to the lower level.

Also FIG. 7 shows the operation of the portal 123 when the portal 123 has received a configuration demand made because of addition of a bus to the lower level. An assumption is made that the portal 123 of the second bridge 120 reserves only two (BID=7 and 8) surplus bus IDs. Another assumption is made that three buses are connected to the bus 106. Similarly to the case shown in FIG. 6, a configuration demand is made from the portal of the bus 106 to the upper level. The portal 123 receives the configuration demand. The portal 123 individually performs configuration of the lower level to assign the bus IDs to the hierarchy. Max Bus ID (=9) larger than 8 assigned in the previous configuration is returned from the lower level. In this case, only the configuration of the level lower than the portal 123 cannot absorb change occurring due to the connection of the bus. Therefore, a configuration demand is made to the upper level. In this case, the bridge manager BM must perform configuration of the overall network.

As described above, the network system according to the embodiment of the present invention has the structure that the second bridge 120 reserves buses of a number which is larger than the number of buses included in a tree structure in which the bus 102 serves as the top of the structure and which includes the second bridge 120 when configuration is performed. Therefore, even if a cause to reconstruct configuration occurs in the tree structure and thus a configuration demand is received from a lower level, configuration of only the lower level is performed. If the number of buses is not larger than the number of previously reserved buses, a configuration demand is not made to the upper level in the tree structure.

Therefore, frequency of configuration in the overall network system can be lowered. As a result, the network system can be stably operated.

The above-mentioned network stores, for example, start and end numbers of identification numbers including the identification numbers which have previously been reserved by the second bridge. Therefore, the destination address of transferred packet data can easily be detected without a necessity of making a reference to a storage medium, for example, a table.

The network system according to the present invention is able to reduce the frequency of configuration in the overall network system. Thus, the network system can stably be operated.

The bridge apparatus according to the present invention is able to reduce the frequency of configuration in the overall network system. As a result, the network system can be stably operated.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A network system comprising:
    a plurality of buses formed by connecting a plurality of nodes to one another through a common communication-control signal line; and
    a bridge for assigning identification numbers to a plurality of buses in a predetermined range among the plurality of the buses which are connected to constitute a tree structure,
        wherein the bridge previously reserves identification numbers of a number which is larger than a number of the identification numbers which assigned to the tree structure having a top thereof formed by a bus of the plurality of buses which includes the bridge, and when a re-assignment demand of the identification number is made from an inside portion of ones of the plurality of buses forming a lower level of the tree structure because of change in a state of the connection of the plurality of buses, the re-assignment demand is not communicated to an upper level of the tree structure if the identification number is not larger than the number of the identification numbers which have previously been reserved so that the re-assignment of the identification number is performed by the lower level of the tree structure.

2. The network system according to claim 1, wherein the lower level is formed as branch portions of the tree structure, and the upper level is formed as a trunk portion of the tree structure.

3. A bridge apparatus comprising:
    a plurality of buses each of which is formed by connecting a plurality of nodes to one another through a common communication-control signal line, said bridge apparatus comprising:
        a bridge for assigning identification numbers to each of the plurality of buses in a predetermined range among the plurality of the buses which constitutes a tree structure,
            wherein the identification numbers that are previously reserved are of a number which is larger than a number of the identification numbers which are assigned to the tree structure having a top thereof formed by a bus which includes the bridge apparatus, and when a re-assignment demand of the identification number is made from an inside portion of the plurality of lower buses of the tree structure because of a change in a state of the connection of the buses, the re-assignment demand is not communicated to an upper level of the tree structure if the number is not larger than the number of the identification numbers which have previously been reserved so that the re-assignment of the identification number is performed by the lower level of the tree structure.

* * * * *